(12) United States Patent
Kusano et al.

(10) Patent No.: US 6,424,909 B2
(45) Date of Patent: Jul. 23, 2002

(54) METHOD AND SYSTEM FOR RETRIEVING INFORMATION FOR A NAVIGATION SYSTEM

(75) Inventors: Manabu Kusano; Noboru Yamazaki, both of Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/805,826

(22) Filed: Mar. 14, 2001

(30) Foreign Application Priority Data

Mar. 17, 2000 (JP) ........................................ 2000-076453
Jan. 22, 2001 (JP) ........................................ 2001-013760

(51) Int. Cl.⁷ ............................................. G01C 21/00
(52) U.S. Cl. ........................... 701/200; 701/207; 705/8; 705/28
(58) Field of Search ................................ 705/8, 28, 29; 701/200–213

(56) References Cited

U.S. PATENT DOCUMENTS

| | | | |
|---|---|---|---|
| 6,370,515 B1 | * | 4/1902 | Diamond et al. .............. 705/28 |
| 4,954,958 A | * | 9/1990 | Savage et al. ............... 701/200 |
| 5,765,123 A | | 6/1998 | Nimura et al. .............. 701/208 |
| 5,910,896 A | * | 6/1999 | Hahn-Carlson .............. 705/29 |
| 6,003,010 A | * | 12/1999 | Scolly et al. .................. 705/8 |
| 6,078,889 A | * | 6/2000 | Boucher et al. ............... 705/1 |

* cited by examiner

Primary Examiner—Richard M. Camby
(74) Attorney, Agent, or Firm—Brinks Hofer Gilson & Lione

(57) ABSTRACT

A destination information retrieval method is provided. When "airports" is selected as a desired destination from a category list, a list of airports is provided. When a desired airport is selected from the provided airport list, it is determined whether the desired airport has a plurality of airport terminals. If a plurality of airport terminals is present, the airlines that utilize the desired airport are retrieved, and a list of the retrieved airlines is provided. When a desired airline is selected from the provided airline list, the airport terminal on the desired airline is displayed in a display window, while a map of the target airport and the vicinity is displayed with a cursor located at the center.

11 Claims, 12 Drawing Sheets

FIG. 2A

| CATEGORY LIST | JL |
|---|---|
| AMUSEMENT PARKS | |
| STATIONS | |
| AIRPORTS | |
| PARKS | |
| HOT SPRINGS | |
| RESTAURANTS | |
| CAFES | |

DPL

FIG. 2B

| AIRPORTS | APL |
|---|---|
| YAMAGATA AIRPORT | |
| SENDAI AIRPORT | |
| FUKUSHIMA AIRPORT | |
| NARITA NEW TOKYO INTERNATIONAL AIRPORT | |
| HANEDA AIRPORT | |
| NIIGATA AIRPORT | |
| NAGOYA AIRPORT | |

DPL

FIG. 2C

| AIRLINES | ACL |
|---|---|
| ALITALIA | |
| KOREAN AIR | |
| JAPAN AIRLINES | |
| ALL NIPPON AIRWAYS | |
| LUFTHANSA GERMAN AIRLINES | |
| AIR CANADA | |
| DELTA AIR LINES | |

DPL

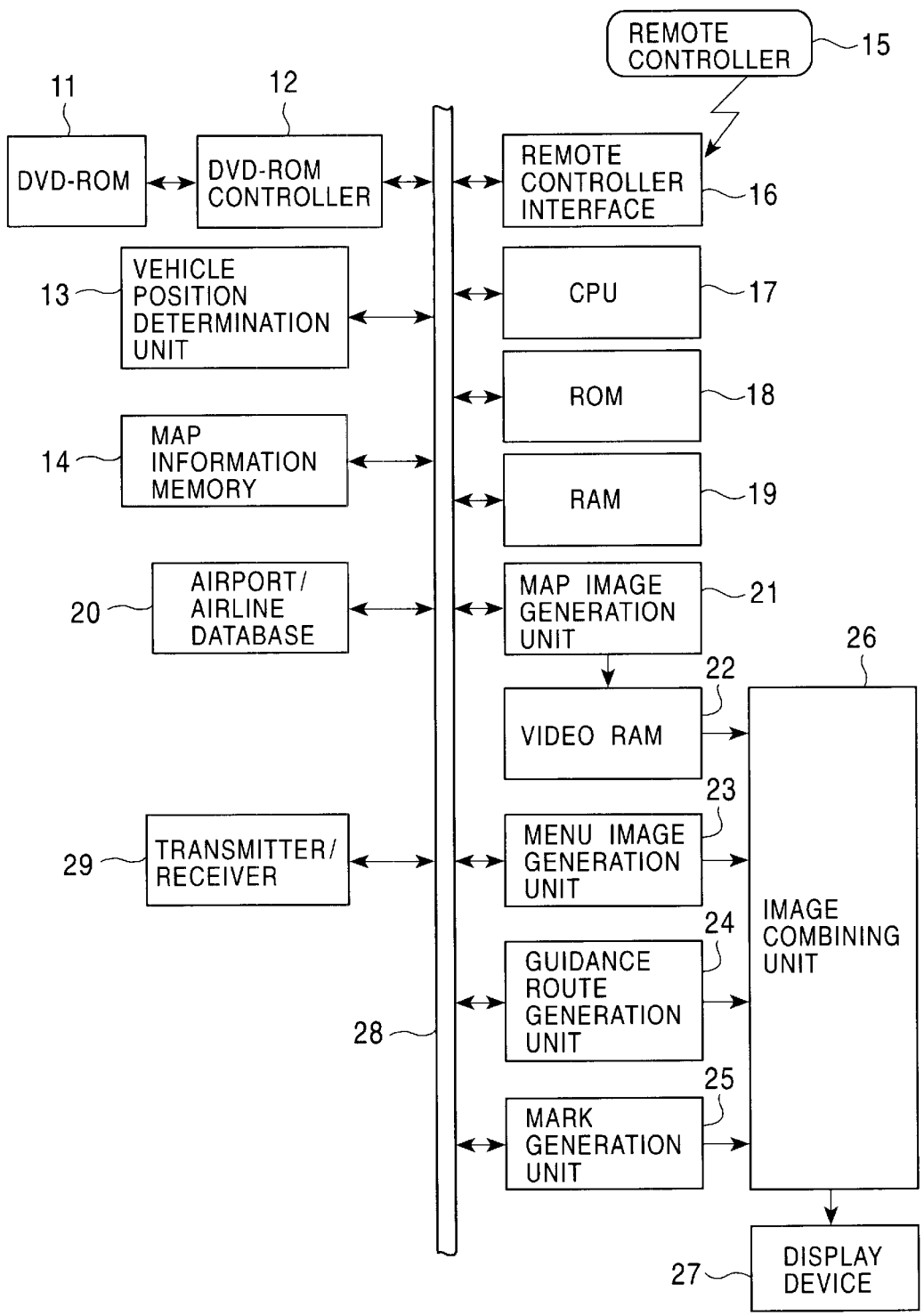

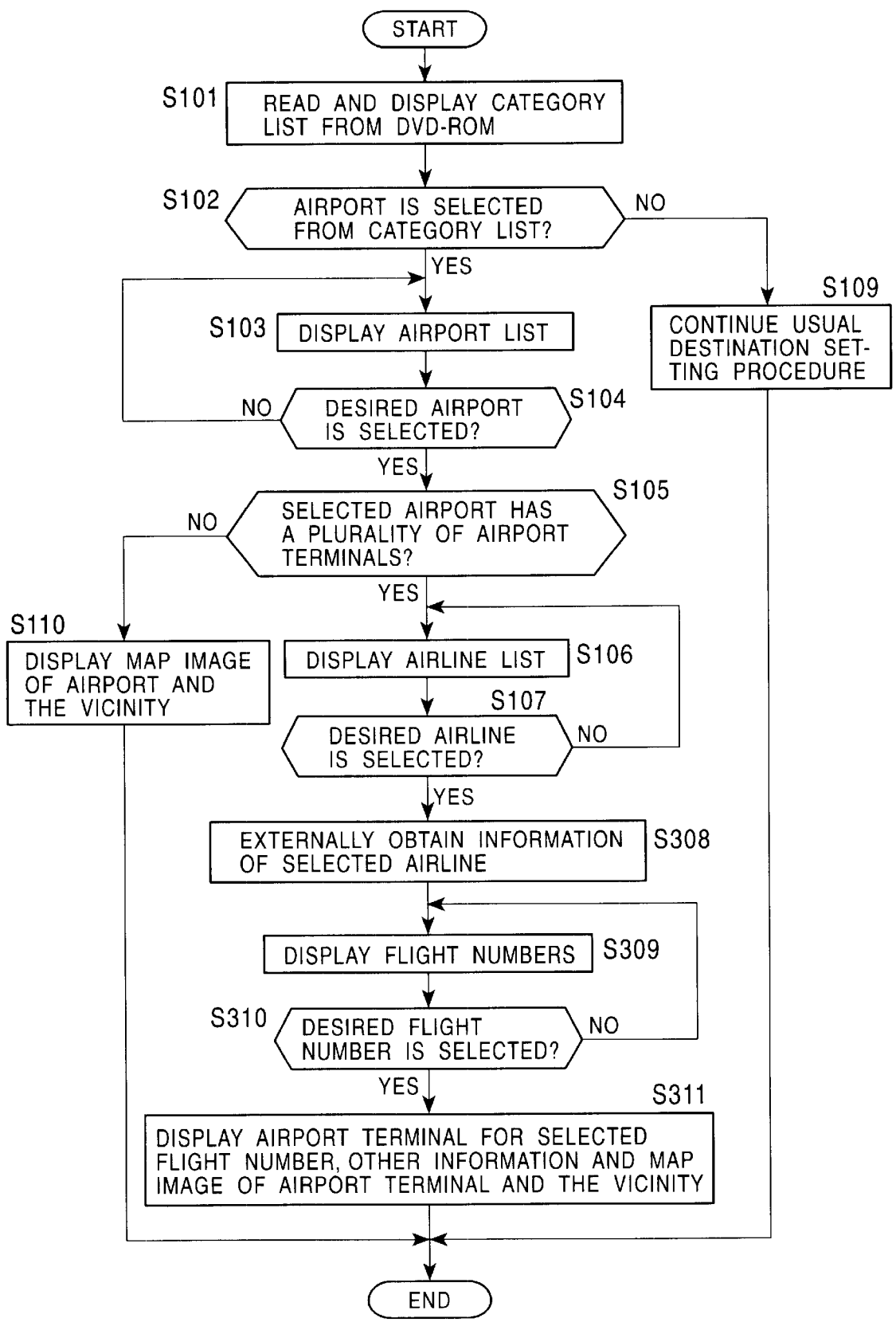

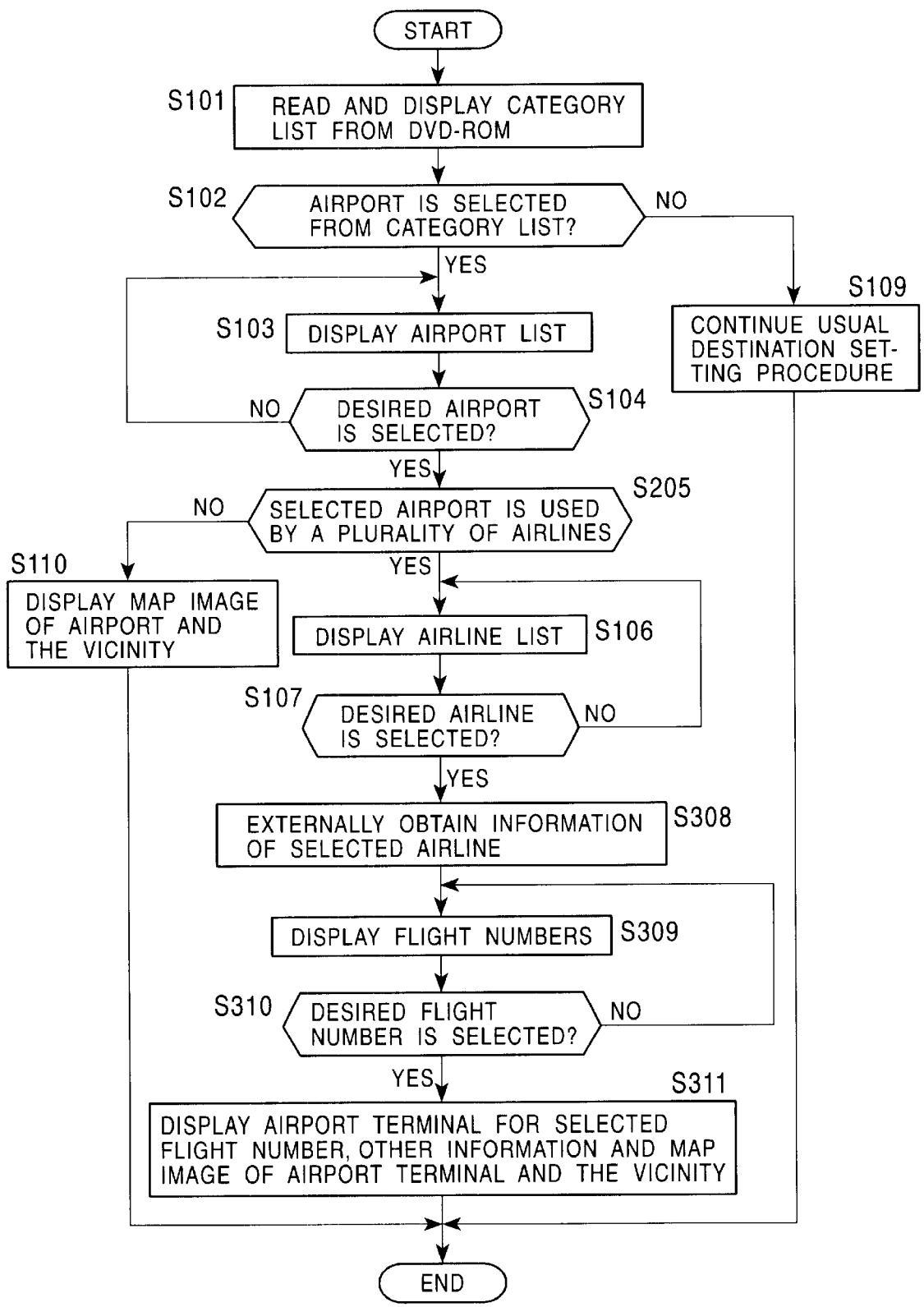

| CATEGORY LIST | ~JL |
| --- | --- |
| AMUSEMENT PARKS | |
| STATIONS | |
| AIRPORTS | |
| PARKS | |
| HOT SPRINGS | |
| RESTAURANTS | |
| CAFES | |

DPL

| AIRPORTS | ~APL |
| --- | --- |
| YAMAGATA AIRPORT | |
| SENDAI AIRPORT | |
| FUKUSHIMA AIRPORT | |
| NARITA NEW TOKYO INTERNATIONAL AIRPORT | |
| HANEDA AIRPORT | |
| NIIGATA AIRPORT | |
| NAGOYA AIRPORT | |

DPL

| TERMINAL NOS. | ~TL |
| --- | --- |
| TERMINAL 1 | |
| TERMINAL 2 | |

DPL

DPL

METHOD AND SYSTEM FOR RETRIEVING INFORMATION FOR A NAVIGATION SYSTEM

BACKGROUND OF THE INVENTION

1. Field of the Invention

The present invention relates to a method and system for retrieving information for a navigation system. More particularly, the present invention relates to a method and system for destination information retrieval that provides information about terminals and transportation companies that utilize transportation stations.

2. Description of the Related Art

Typically, a navigation system for navigating a vehicle guides a user to a desired destination by determining the vehicle position, reading map data for the vehicle position and the vicinity from a storage medium such as a DVD-ROM, and displaying a map image on a display screen based on the read map data while displaying a vehicle position mark superimposed at a predetermined position on the map image. The vehicle position mark may be moved on the screen as the vehicle position moves as the vehicle travels, or the vehicle position mark may be fixed to a predetermined position, such as the center, of the map which is then scrolled, in order to provide map information of the vehicle position and the vicinity at a glance. Such a navigation system has a route guiding function that determines a guidance route from a starting point to a destination, displays the guidance route on the map, and performs intersection guidance together with a zoomed map of an intersection and an indication of the travel direction. FIGS. 11A to 11D are views showing a known destination information retrieval method for navigation systems when the desired destination is an airport by way of example.

First, a telephone directory or a category list JL is displayed on a display DPL, as shown in FIG. 11A. When a user selects "airports," an airport list APL shown in FIG. 11B is then displayed, and an airport terminal list TL shown in FIG. 11C is displayed in response to selection of the desired airport. In turn, when a desired airport terminal is selected, a map of the desired destination, namely, a target airport TGT, and the vicinity is displayed, as shown in FIG. 11D, with the target airport TGT being located at the center. The displayed map can be used to enter a destination or to register some points.

However, such a conventional destination information retrieval method for navigation systems encounters some problems. For example, when an airport is entered as a destination, the conventional method does not involve providing information about airport terminals on airline companies that utilize that airport, and it is cumbersome for users to ask the airline company in advance about the airport terminal.

Further, the conventional destination information retrieval method does not involve providing flight information, and it is cumbersome for users to previously ask the airline company in advance about the flight information.

SUMMARY OF THE INVENTION

Accordingly, an object of the present invention involves, when a transportation station is inputted as a desired destination, allowing a user to select a desired transportation company in the destination retrieval, whereby selection of the transportation company facilitates the provision of the desired terminal of that station.

Another object of the present invention involves, when a transportation station is inputted as a desired destination, allowing a user to select a desired service number of a transportation company, such as a flight number, in the destination retrieval, thereby providing information about the desired service number.

To this end, in one embodiment of the present invention, a destination information retrieval method for navigation systems, for retrieving information about a desired destination, includes the acts of: storing transportation station data, transportation company data, and terminal data in a database; searching the database for a desired transportation station when the desired transportation station is inputted as the desired destination; providing information about one or more transportation companies that utilize the desired station; and providing information about one or more terminals when a desired transportation company is selected.

The transportation stations may be airports, and the transportation companies may be airlines.

The destination information retrieval method may further include the acts of: determining, based on the desired transportation station, whether the desired transportation station has a plurality of terminals; and providing information about the one or more transportation companies that utilize the desired transportation station when the station searched for has a plurality of terminals.

The destination information retrieval method may further include the steps of: determining, based on the information about the desired transportation station, whether the desired transportation station is utilized by a plurality of transportation companies; and providing information about one or more transportation companies that utilize the desired transportation station when the desired transportation station is utilized by a plurality of transportation companies.

In another aspect of the present invention, a navigation system for retrieving information about a desired destination includes: a storage unit for storing therein transportation station data, transportation company data, and terminal data; a searching unit for, when a desired transportation station is inputted as the desired destination, searching the storage unit for the desired transportation station, and for determining, based on the transportation station data, whether the desired transportation station has a plurality of terminals; and a control unit for, when it is found from the result of the searching unit that the desired transportation station has a plurality of terminals, searching the transportation station data for transportation companies that utilize the desired transportation station to provide information about the resulting transportation companies, and providing information about the terminal in which a desired transportation company operates when the desired transportation company is selected from the provided transportation companies.

According to the present invention, a navigation system for retrieving information about a desired destination may also include: a storage unit for storing therein transportation station data, transportation company data, and terminal data; a searching unit for, when a desired transportation station is inputted as the destination, searching the storage unit for the desired transportation station, and for determining, based on the information about the desired transportation station, whether the station is utilized by a plurality of transportation companies; and a control unit for, when it is found from the result of the searching unit that the desired transportation station is utilized by a plurality of transportation companies, providing information about the plurality of transportation companies, and providing information about the terminal in which a desired transportation company operates when the desired transportation company is selected from the provided transportation companies.

The storage unit may contain airport data as the transportation station data, and airline data as the transportation company data.

In another aspect of the present invention, a destination information retrieval method for navigation systems, for retrieving information about a desired destination which has been inputted, includes the acts of: storing transportation station data, transportation company data, and terminal data in a database; searching the database for a desired transportation station when the desired transportation station is inputted as the destination; determining, based on the information about the desired transportation station, whether the desired transportation station has a plurality of terminals; when the desired transportation station has a plurality of terminals, searching the database for one or more transportation companies that utilize the desired transportation station to provide information about the resulting transportation companies; when a desired transportation company is selected from the one or more transportation companies that utilize the desired transportation station, providing service information about the desired transportation company, the service number information being externally obtained; and providing information about the terminal for a desired service number when the desired service number is selected from the provided service information.

In another aspect of the present invention, a destination information retrieval method for navigation systems, for retrieving information about a desired destination which has been inputted, includes the acts of: storing transportation station data, transportation company data, and terminal data; searching the database for a desired transportation station when the desired station is inputted as the desired destination; determining, based on the information about the desired station, whether the desired station has a plurality of transportation companies; when the desired station has a plurality of transportation companies, providing information about the plurality of transportation companies; when a desired transportation company is selected from a plurality of transportation companies, providing service number information for the desired transportation company, the service number information being externally obtained; and providing information about the terminal for a desired service number when the desired service number is selected from the provided service information.

BRIEF DESCRIPTION OF THE DRAWINGS

FIGS. 2A to 2E are views showing a destination information retrieval method according to a second feature of the present invention;

FIG. 8 is a block diagram of a navigation system according to a third embodiment of the present invention;

FIG. 9 is a flowchart showing the operation of the navigation system according to the third embodiment;

FIG. 10 is a flowchart showing the operation of a navigation system according to a fourth embodiment of the present invention.

DESCRIPTION OF THE PREFERRED EMBODIMENTS

Overview

The overview of a first feature that may be utilized with the present invention is described with reference to FIGS. 1A to 1D showing an instance in which the desired destination is an airport by way of example.

Figure 1A:
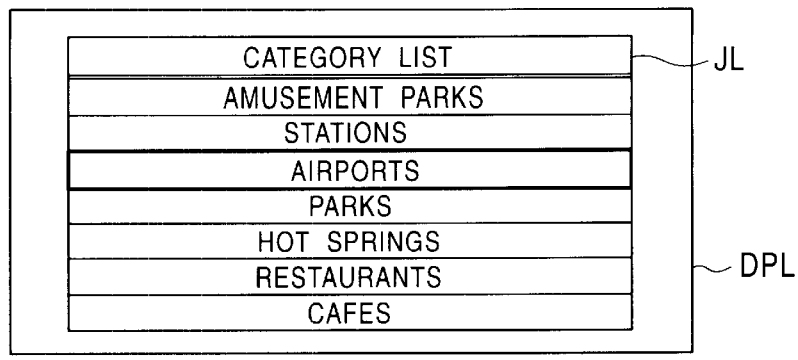
FIGS. 1A to 1D are views schematically showing a destination information retrieval method according to a first feature of the present invention.
Figure 1B:
Figure 1C:
Figure 1D:
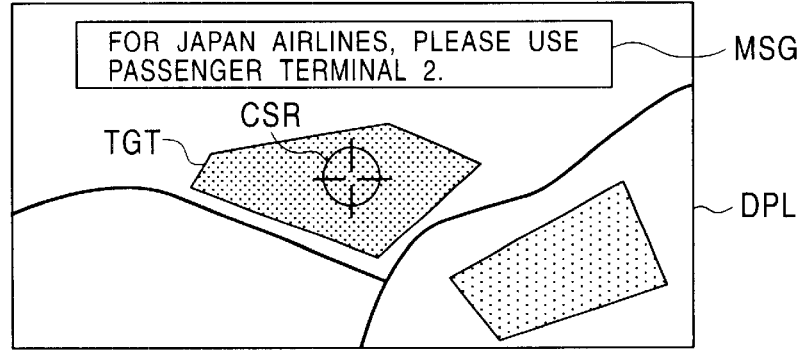

First, a category list JL containing amusement parks, stations, airports, etc. is displayed on a display DPL, as shown in FIG. 1A. When a user selects "airports" from the category list JL, an airport list APL containing airports, for example, Yamagata Airport, Sendai Airport, and so on, is then displayed, as shown in FIG. 1B. When the user selects a desired airport from the displayed airport list APL, it is determined whether the desired airport has a plurality of airport terminals. If a plurality of airport terminals are present, the airlines that utilize that airport are retrieved, and a list, i.e., an airline list ACL is displayed on the display DPL, of the retrieved airlines, for example, Japan Airlines, and so on as shown in FIG. 1C. When a desired airline is selected from the displayed airline list ACL, as shown in FIG. 1D, the airport terminal on the desired airline is displayed in an information display window MSG, while a map of the desired destination, namely, a target airport TGT, and the vicinity is displayed with a cursor CSR located at the center. Alternatively, instead of the map of the target airport TGT and the vicinity with the cursor CSR located at the center, other information such as the entrance to the desired airport terminal or a parking lot near the airport terminal may be provided.

The overview of a second feature that may be utilized with the present invention is described with reference to FIGS. 2A to 2E showing when the desired destination is an airport by way of example.

Figures 2D, 2E:
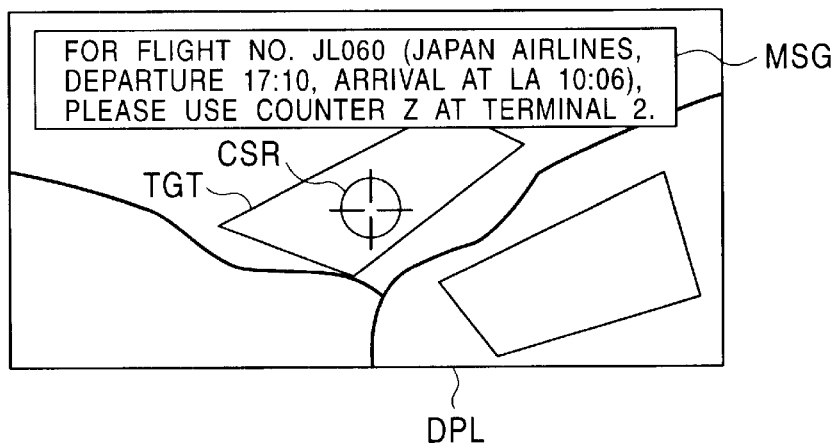

First, a category list JL containing amusement parks, stations, airports, etc. is displayed on a display DPL as shown in FIG. 2A. When a user selects "airports" from the category list JL, an airport list APL containing airports, for example, Yamagata Airport, Sendai Airport, and so on, is then displayed, as shown in FIG. 2B. When the user selects a desired airport from the displayed airport list APL, it is determined whether the desired airport has a plurality of airport terminals. If a plurality of airport terminals are present, the airlines that utilize that airport are retrieved, and a retrieved airline list ACL, for example, Japan Airlines, and so on, is displayed on the display DPL, as shown in FIG. 2C. When a desired airline is selected from the displayed airline list ACL, various information such as flight numbers and the airport terminal on the desired airline is externally obtained, and a list of the flight numbers FL is displayed from the obtained information, as shown in FIG. 2D. When a desired flight number is selected from the displayed flight number list FL, as shown in FIG. 2E, the resulting airport terminal is displayed on an information display window MSG together with any other information, while a map of the desired destination, namely, a target airport TGT, and the vicinity is displayed with a cursor CSR located at the center.

Alternatively, instead of the map of the target airport TGT and the vicinity with the cursor CSR located at the center, other information such as the entrance to the desired airport terminal or a parking lot near the airport terminal may be provided.

First Embodiment

Figure 3:
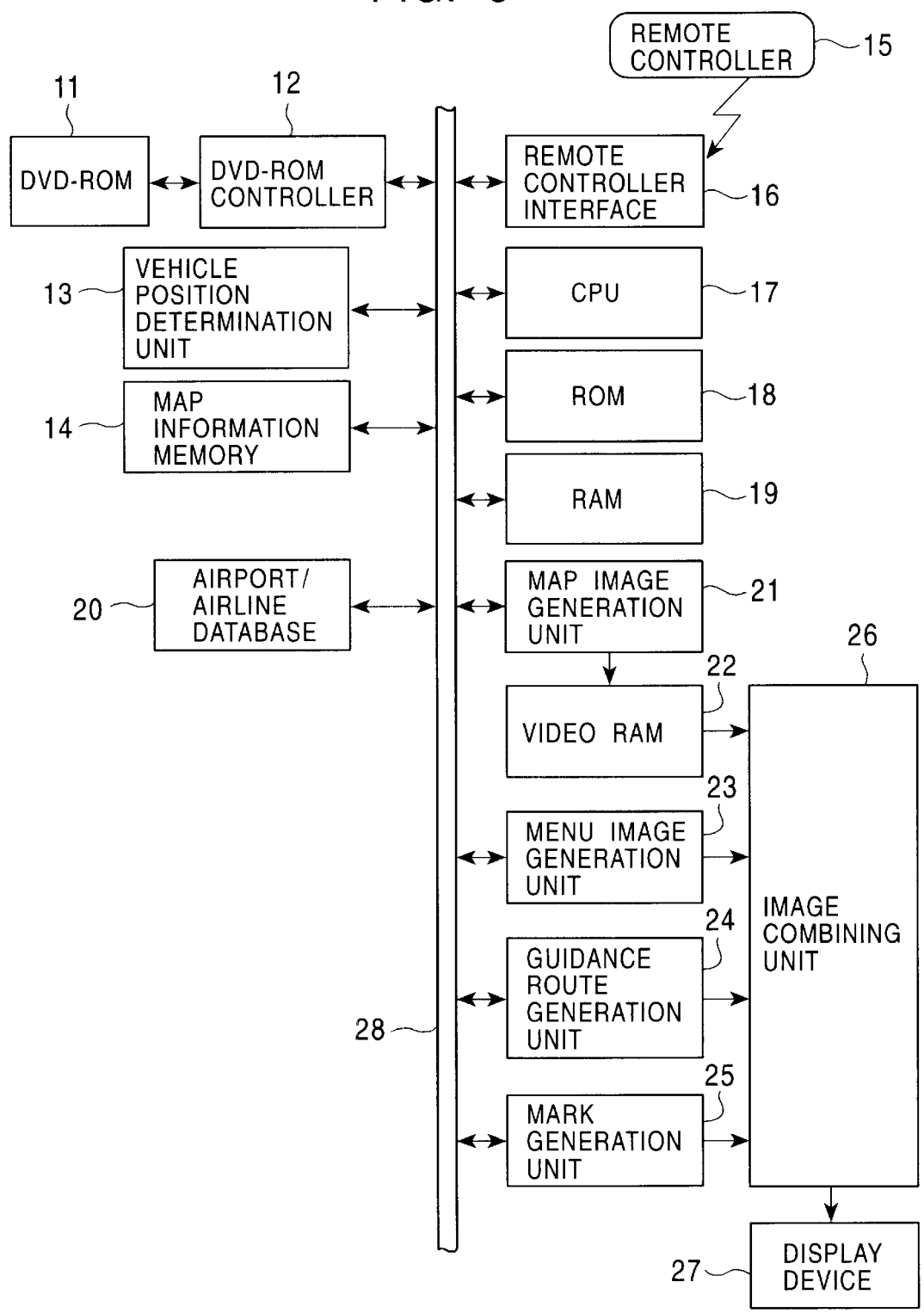
FIG. 3 is a block diagram of a navigation system according to a first embodiment of the present invention.

FIG. 3 is a block diagram of a navigation system according to a first embodiment of the present invention.

The navigation system includes a map data storage medium, such as a DVD-ROM 11, for storing map information, a DVD-ROM controller 12 for controlling reading of the map data from the DVD-ROM 11, and a vehicle position determination unit 13 for determining the vehicle position. The vehicle position determination unit 13 includes a vehicle speed sensor for determining a traveled distance of the vehicle, an angular speed sensor for sensing a traveling direction of the vehicle, a GPS receiver, and a position calculating CPU. The navigation system further includes a map information memory 14 for storing map information read from the DVD-ROM 11, a remote controller 15 used for manipulations such as menu selection, zooming, and manual scrolling through the map, and a remote controller interface 16.

The navigation system also includes a processor (CPU) 17 for controlling the overall navigation system. The processor 17 performs various controls in response to manipulation instructions from the remote controller 15. Various programs including a route-finding program are stored in a ROM 18, and the processing results of such programs, such as routes found, are stored in a RAM 19. An airport/airline database 20 contains information such as the location of airport and airline information. The navigation system further includes a map image generation unit 21 for generating map images, a video RAM 22 for storing the generated map images, a menu image generation unit 23 for generating images of menus such as a destination retrieving menu, a guidance route generation unit 24 for generating the found guidance route, a mark generation unit 25 for generating marks such as a vehicle position mark, and a bus 28. The various images which are generated are combined by an image combining unit 26, and the resulting combined image is output therefrom. A display unit 27 displays the image output from the image combining unit 26.

Figure 4:
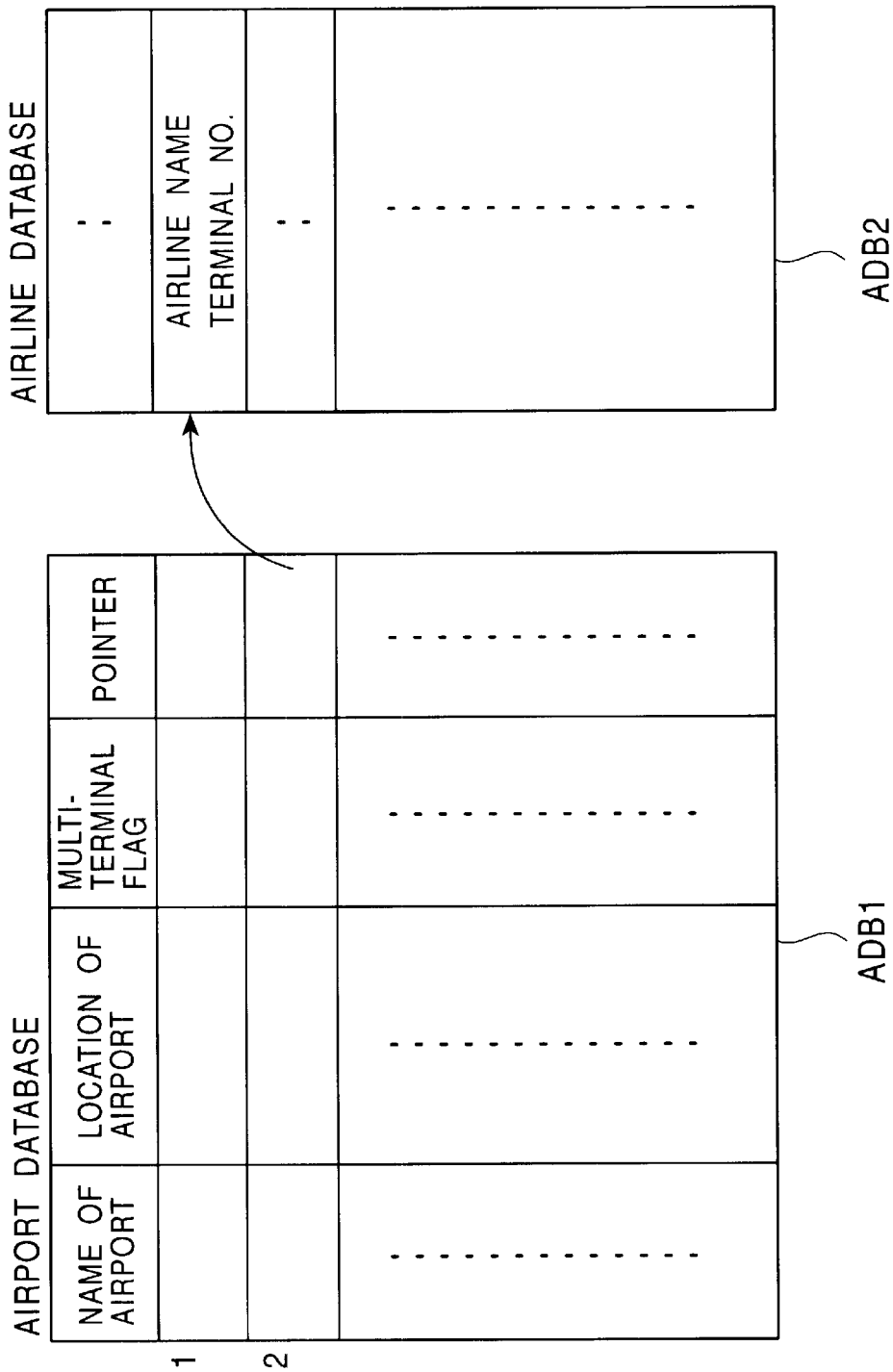
FIG. 4 is a table of an airport/airline database according to the first embodiment.

The airport/airline database 20 contains information such as the location of airport and airline information associated with the name of the airport in the map information stored in the DVD-ROM 11. A specific example of the airport/airline database 20 is shown in FIG. 4, showing the hierarchical structure. An airport database ADB1 contains information for each airline such as the location of the airport, a multi-terminal flag indicating whether the desired airport has a plurality of airport terminals, and a pointer indicating the location of airline data associated with the name of the airport. An airline database ADB 2 contains the name of airline, and the name of the airport terminal on the airline.

Figure 5:
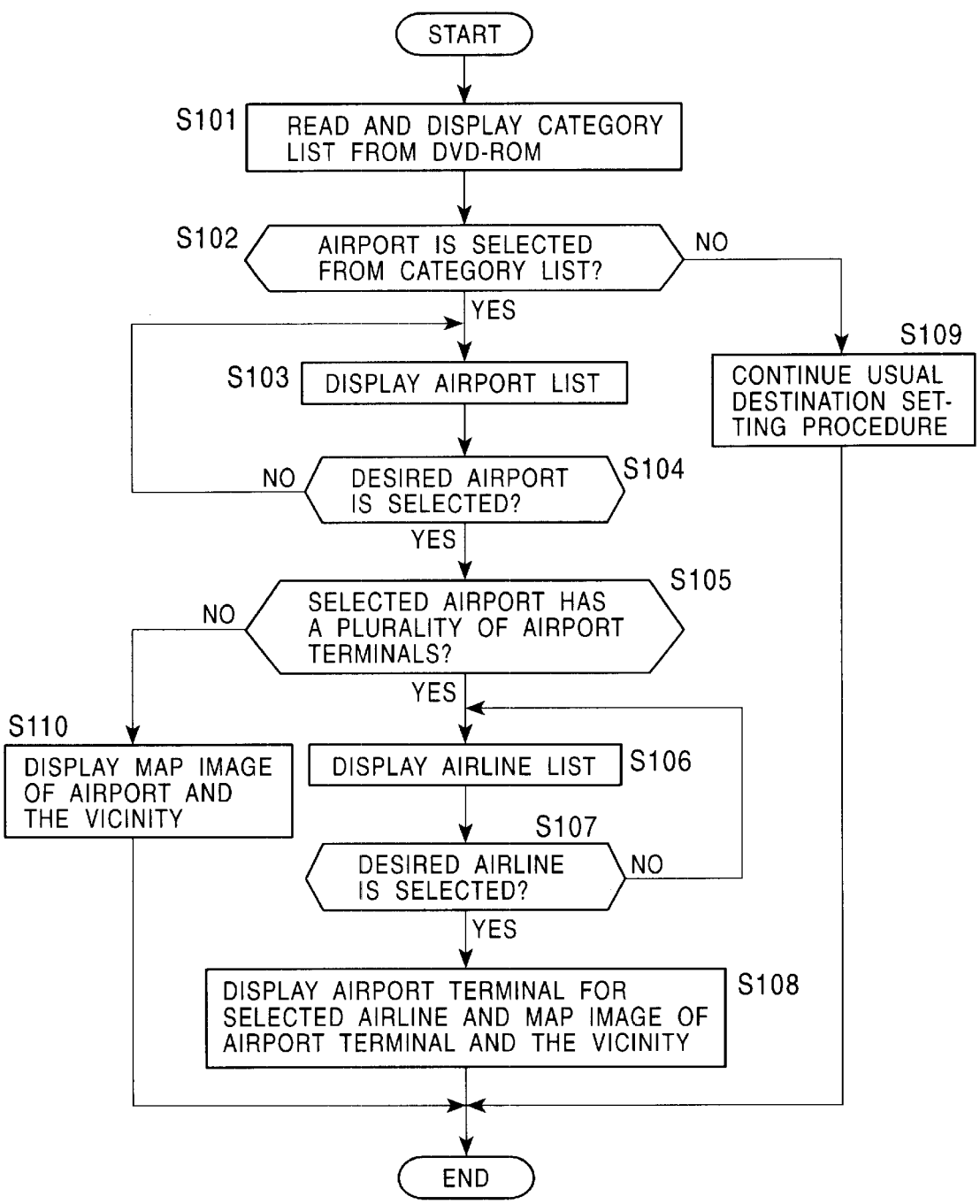
FIG. 5 is a flowchart showing the operation of the navigation system according to the first embodiment.

FIG. 5 is a flowchart showing the operation of the navigation system according to the first embodiment.

First, when a destination information retrieval key (not shown) is pressed by a user through a menu selection manipulation of the remote controller 15, the processor 17 allows the category list JL to be read from the DVD-ROM 11 and then displayed on the display unit 27, as shown in FIG. 1A (S101). Then, it is determined whether the user selected "airports" from the category list JL (S102). If the "airports" is selected at step S102, the airport list APL shown in FIG. 1B is displayed (S103). Then, it is determined whether the user selected a desired airport from the airport list APL (S104). If a desired airport is not selected at step S104, the process returns to step S103 to continue displaying the airport list APL. Otherwise, i.e., if a desired airport is selected at step S104, the airport/airline database 20 is searched for whether the desired airport has a plurality of airport terminals (S105).

If step S105 determines that a plurality of airport terminals are present, the airport/airline database 20 is searched for the airlines that utilize that airport, and the airlines are listed and displayed as the airline list ACL, as shown in FIG. 1C (S106). It is then determined whether a desired airline is selected from the displayed airline list ACL (S107). If a desired airline is not selected at step S107, the process returns to step S106 to continue displaying the airline list ACL. Otherwise, i.e., if a desired airline is selected at step S107, the airport/airline database 20 is searched for the airport terminal on the desired airline, and that airport terminal on the desired airline is then displayed together with the map of that airport terminal and the vicinity, as shown in FIG. 1D (S108).

If any category other than "airports" is selected at step S102, a usual destination setting procedure is continuously performed (S109).

If step S105 determines that the desired airport does not have a plurality of airport terminals, the process proceeds to step S110 in which a map of that airport and the vicinity is displayed.

In the subsequent procedure, a destination may be entered for route guidance, or points may be registered.

Second Embodiment

A navigation system according to a second embodiment of the present invention has substantially the same structure as that of the navigation system according to the first embodiment described with reference to FIG. 3. Examples of the provided lists according to the second embodiment are the same as those shown in FIGS. 1A to 1D.

Figure 6:
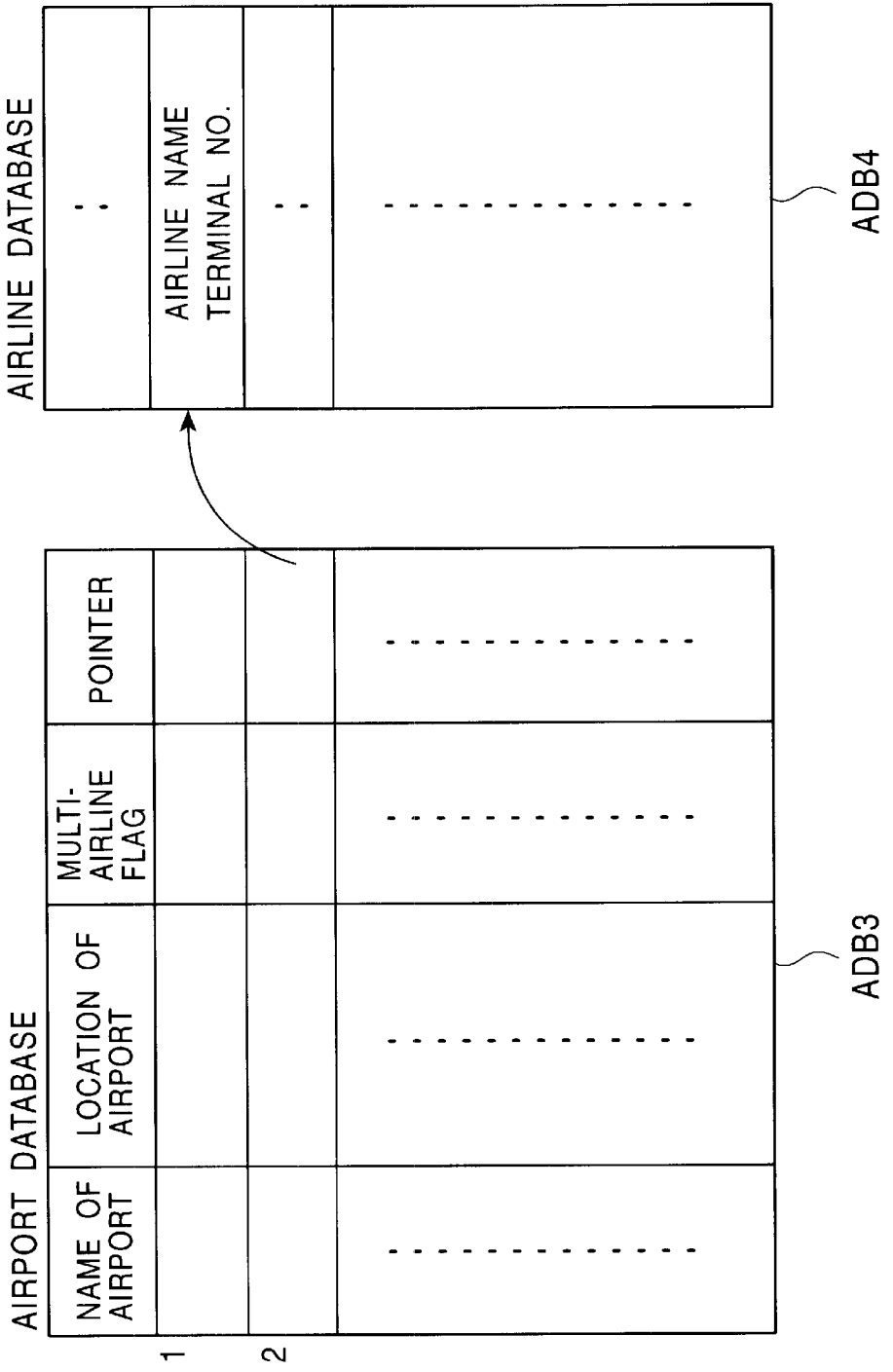
FIG. 6 is a table of an airport/airline database according to a second embodiment of the present invention.

FIG. 6 illustrates a modification of the airport/airline database 20 shown in FIG. 4, which contains information such as the location of the airport and airline information to be associated with the name of the airport in the map information stored in the DVD-ROM 11. The modified example of the airport/airline database 20 has a hierarchical structure. An airport database ADB3 contains information for each airline such as the location of the airport, a multi-airline flag indicating whether the desired airport is utilized by a plurality of airline companies, and a pointer indicating the location of airline data associated with the name of the airport. An airline database ADB 4 contains the name of the airline, and the name of the airport terminal on the airline.

Figure 7:
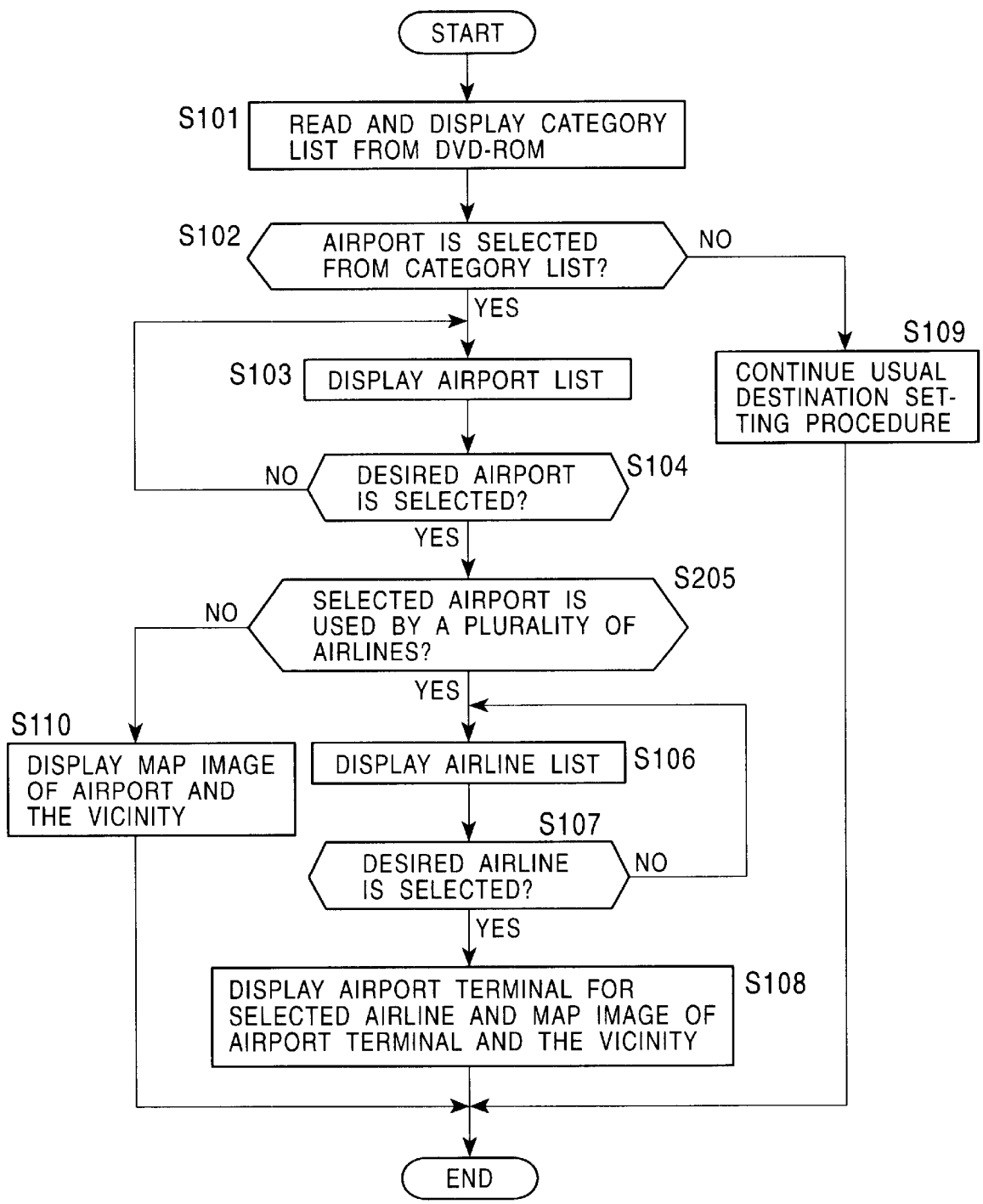
FIG. 7 is a flowchart showing the operation of the navigation system according to the second embodiment.
Figures 11A, 11B, 11C, 11D:
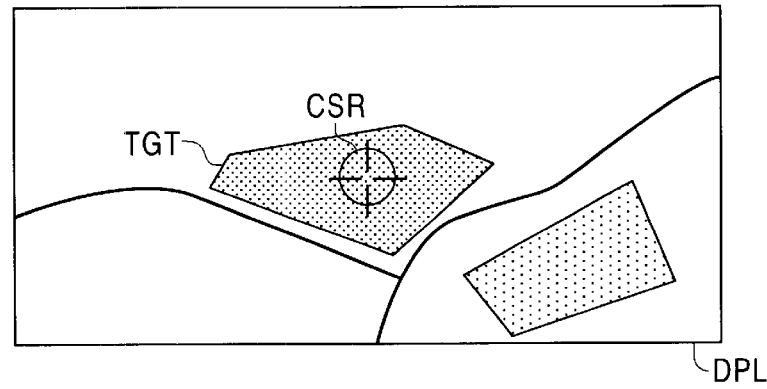
FIGS. 11A to 11D are views showing a known destination information retrieval method for navigation systems.

FIG. 7 is a flowchart showing the operation of the navigation system according to the second embodiment. The same step numbers are given to the same steps as those shown in FIG. 5.

First, when a destination information retrieval key (not shown) is pressed by a user through a menu selection manipulation of the remote controller 15, the processor 17 allows the category list JL to be read from the DVD-ROM 11 and then displayed on the display unit 27, as shown in FIG. 1A (S101). Then, it is determined whether the user selected "airports" from the list JL (S102). If the "airports" is selected at step S102, the airport list APL shown in FIG. 1B is displayed (S103). Then, it is determined whether the user selected a desired airport from the airport list APL (S104). If a desired airport is not selected at step S104, the process returns to step S103 to continue displaying the airport list APL. Otherwise, i.e., if a desired airport is selected at step S104, the airport/airline database 20 is searched for whether the desired airport is utilized by a plurality of airlines (S205). If step S105 determines that there is a plurality of airlines that utilize that airport, the airport/airline database 20 is searched for the airlines that utilize that airport, and the resulting airlines are listed and displayed as the airline list ACL, as shown in FIG. 1C (S106).

It is then determined whether a desired airline is selected from the displayed airline list ACL (S107). If a desired airline is not selected at step S107, the process returns to step S106 to continue displaying the airline list ACL. Otherwise, i.e., if a desired airline is selected at step S107, the airport/airline database 20 is searched for the airport terminal on the desired airline, and that airport terminal on the desired airline is then displayed together with the map of that airport terminal and the vicinity, as shown in FIG. 1D (S108).

If any category other than "airports" is selected at step S102, a usual destination setting procedure is continuously performed (S109).

If step S105 determines that the desired airport is not utilized by a plurality of airlines, the process proceeds to step S110 in which a map of that airport and the vicinity is displayed.

In the subsequent procedure, a destination may be entered for route guidance, or points may be registered. While information of the resulting airline based on the airport information and the airport terminal on that airline is visually provided in the first and second embodiments, such information may be provided by voice or the like.

Third Embodiment

FIG. 8 is a block diagram of a navigation system according to a third embodiment of the present invention. The navigation system according to the third embodiment provides an additional a transmitter/receiver 29 for externally obtaining information including flight numbers.

FIG. 9 is a flowchart showing the operation of the navigation system according to the third embodiment. The same step numbers are given to the same steps as those shown in FIG. 5. Since the procedure up to step S107 is the same as that of the first embodiment, description thereof is omitted.

If a desired airline is selected at step S107, the transmitter/receiver 29 requests and externally obtains information including flight numbers for the desired airline (S308). A list of the flight numbers is displayed on the display device 27 from the obtained information, as shown in FIG. 2D (S309), and it is then determined whether a desired flight number is selected from the displayed flight numbers (S310). If a desired flight number is not selected at step S310, the process returns to step S309 in which a predetermined processing is performed. Otherwise, i.e., a desired flight number is selected at step S310, the airport terminal for the desired flight number, other information including the departure/arrival time, and the map of that airport terminal and the vicinity are displayed (S311).

In the subsequent procedure, a destination may be entered for route guidance, or points may be registered.

Fourth Embodiment

A navigation system according to a fourth embodiment of the present invention has substantially the same structure as that of the navigation system according to the third embodiment described with reference to FIG. 8. Examples of the provided lists according to the fourth embodiment are the same as those shown in FIGS. 2A to 2E.

FIG. 10 is a flowchart showing the operation of the navigation system according to the fourth embodiment. The same step numbers are given to the same steps as those of the navigation system according to the third embodiment described with reference to FIG. 9. In the process according to the third embodiment, it is determined at step S105 whether the desired airport has a plurality of airport terminals. In the fourth embodiment, it is determined whether the desired airport is utilized by a plurality of airlines (S205).

While information such as the names of airlines, flight numbers, and the names of airport terminals is visually provided in the third and fourth embodiments, such information may be provided by voice or the like.

While the present invention has been described using an airport as a destination example, the present invention may be embodied in other destinations including railway stations, bus stops, and harbors. In those cases, airline companies are replaced by railway companies, bus companies, and shipping companies.

According to the present invention, therefore, a user can easily learn the accurate terminal on the desired transportation company without it being necessary for the user to ask the transportation company in advance about the terminal.

Further, according to the present invention, a user can obtain information about the desired service number, such as flight numbers, bus route numbers, and ship route numbers, without it being necessary for the user to ask the transportation company in advance about the service number.

What is claimed is:

1. A destination information retrieval method for navigation systems, for retrieving information about a desired destination, said method comprising the acts of:

storing transportation station data, transportation company data, and terminal data in a database;

searching the database for a desired transportation station when the desired transportation station is inputted as the desired destination;

providing information about one or more transportation companies that utilize the desired station; and providing information about one or more terminals when a desired transportation company is selected.

2. A destination information retrieval method according to claim 1, wherein the transportation stations include airports, and the transportation companies include airlines.

3. A destination information retrieval method according to claim 1, further comprising the acts of:

determining, based on the information about the desired transportation station, whether the desired transportation station has a plurality of terminals; and providing information about one or more transportation companies that utilize the desired transportation station when the desired transportation station has a plurality of terminals.

4. A navigation system for retrieving information about a desired destination, said navigation system comprising:

a storage unit for storing therein transportation station data, transportation company data, and terminal data;

a searching unit for searching said storage unit for a desired transportation station when the desired transportation station is inputted as the desired destination, and for determining, based on the transportation station data, whether the desired transportation station has a plurality of terminals; and a control unit for, when it is found from the result of said searching unit that the desired transportation station has a plurality of terminals, searching the transportation station data for transportation companies that utilize the desired transportation station to provide a set of resulting transportation companies, and providing information about the terminal in which a desired transportation company operates when the desired transportation company is selected from the provided transportation companies.

5. A navigation system according to claim 4, wherein said storage unit contains airport data as the transportation station data, and airline data as the transportation company data.

6. A navigation system for retrieving information about a desired destination, said navigation system comprising:
   a storage unit for storing therein transportation station data, transportation company data, and terminal data;
   a searching unit for searching said storage unit for a desired transportation station when the desired transportation station is inputted as the desired destination, and for determining, based on the information about the desired transportation station, whether the desired transportation station is utilized by a plurality of transportation companies; and
   a control unit for, when it is found from the result of said searching unit that the desired transportation station is utilized by a plurality of transportation companies, providing information about the plurality of transportation companies, and providing information about the terminal in which a desired transportation company operates when the desired transportation company is selected from the provided transportation companies.

7. A navigation system according to claim 6, wherein said storage unit contains airport data as the transportation station data, and airline data as the transportation company data.

8. A destination information retrieval method for navigation systems, for retrieving information about a desired destination, said method comprising the acts of:
   storing transportation station data, transportation company data, and terminal data in a database;
   searching the database for a desired transportation station when the desired transportation station is inputted as the desired destination;
   determining, based on the information about the desired transportation station, whether the desired transportation station has a plurality of terminals;
   when the desired transportation station has a plurality of terminals, searching the database for one or more transportation companies that utilize the desired transportation station to provide information about the resulting transportation companies;
   when a desired transportation company is selected from the one or more transportation companies that utilize the desired transportation station, providing service information about the desired transportation company, said service number information being externally obtained; and
   providing information about the terminal for a desired service number when the desired service number is selected from the provided service information.

9. A destination information retrieval method according to claim 8, wherein the transportation stations include airports, and the transportation companies include airlines.

10. A destination information retrieval method for navigation systems, for retrieving information about a desired destination, said method comprising the acts of:
    storing transportation station data, transportation company data, and terminal data;
    searching the database for a desired transportation station when the desired transportation station is inputted as the desired destination;
    determining, based on the information about the desired station, whether the desired station has a plurality of transportation companies;
    when the desired station has a plurality of transportation companies, providing information about the plurality of transportation companies;
    when a desired transportation company is selected from the plurality of transportation companies, providing service number information for the desired transportation company, said service number information being externally obtained; and
    providing information about the terminal for a desired service number when the desired service number is selected from the provided service information.

11. A destination information retrieval method according to claim 10, wherein the transportation stations include airports, and the transportation companies include airlines.

* * * * *